(12) United States Patent
Yokoyama et al.

(10) Patent No.: US 8,573,950 B2
(45) Date of Patent: Nov. 5, 2013

(54) TOWER INTERNAL-EQUIPMENT BRACKET STRUCTURE AND WIND TURBINE GENERATOR

(75) Inventors: Hiroaki Yokoyama, Tokyo (JP); Yoshisuke Itoh, Tokyo (JP); Minoru Kawabata, Tokyo (JP); Tsuyoshi Haraguchi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/396,050

(22) Filed: Feb. 14, 2012

(65) Prior Publication Data
US 2013/0115054 A1 May 9, 2013

Related U.S. Application Data (63) Continuation of application No. PCT/JP2011/075439, filed on Nov. 4, 2011.

(51) Int. Cl.
*F03D 11/00* (2006.01)

(52) U.S. Cl.
USPC .......................... 416/244 R; 52/40

(58) Field of Classification Search
USPC ................ 416/244 R; 52/40, 651.01, 745.17, 52/745.18, 223.3, 223.4, 651.07, 834
See application file for complete search history.

(56) References Cited

U.S. PATENT DOCUMENTS

| | | | |
|---|---|---|---|
| 7,762,037 B2 * | 7/2010 | Meiners | 52/651.01 |
| 2003/0147753 A1 | 8/2003 | Ollgaard | |
| 2007/0125037 A1 | 6/2007 | Meiners | |
| 2010/0122508 A1 | 5/2010 | Kristensen | |
| 2011/0140437 A1 * | 6/2011 | Vemuri et al. | 290/55 |

FOREIGN PATENT DOCUMENTS

| | | |
|---|---|---|
| JP | 53-145341 B | 11/1978 |
| JP | S56-82043 | 7/1981 |
| JP | 2001-159260 A | 6/2001 |
| JP | 2005-163336 A | 6/2005 |
| JP | 2005-517124 | 6/2005 |
| JP | 2006-22675 A | 1/2006 |
| JP | 2008-45395 A | 2/2008 |
| JP | 2010-150985 | 7/2010 |
| WO | WO 2009/028092 A1 | 3/2009 |
| WO | WO 2010/006659 A1 | 1/2010 |

* cited by examiner

*Primary Examiner* — Dwayne J White
(74) *Attorney, Agent, or Firm* — Manabu Kanesaka; Kenneth M. Berner; Benjamin J. Hauptman (57) ABSTRACT

A tower-internal-equipment bracket structure with a welded structure that can ensure a fatigue strength classification equal to or greater than that of butt welding (BW) or that requires no welding and a wind turbine generator provided with this tower-internal-equipment bracket structure are provided. In a tower-internal-equipment bracket structure provided inside a pole-type steel tower, employing a cylindrical shell (11), to support tower internal equipment, a ring-shaped member (20) having a protruding portion (21) toward the tower interior is interposed, by means of butt welding (BW), between divided portions formed by dividing the cylindrical shell (11) at a desired position in an axial direction, and the protruding portion (21) serves as a bracket-member support portion for the tower internal equipment.

19 Claims, 12 Drawing Sheets

FIG. 16
Prior Art

TOWER INTERNAL-EQUIPMENT BRACKET STRUCTURE AND WIND TURBINE GENERATOR

CROSS REFERENCE TO RELATED APPLICATIONS

This is a continuation of International Application PCT/JP2011/075439, with an international filing date of Nov. 4, 2011, which is hereby incorporated by reference herein in its entirety.

TECHNICAL FIELD

The present invention relates to a tower-internal-equipment bracket structure applied to a monopole-type steel tower for a wind turbine generator etc. and relates to a wind turbine generator provided with this tower-internal-equipment bracket structure.

BACKGROUND ART

A wind turbine generator is an apparatus in which a rotor head provided with turbine blades rotates by receiving the force of wind and power is generated by a generator driven by utilizing this rotation.

The above-described rotor head is mounted at an end of a nacelle installed on a wind turbine tower (hereinafter, referred to as "tower") in such a manner as to allow yawing, and the rotor head is supported thereon in such a manner as to allow rotation about a substantially horizontal lateral rotation axis.

In general, the above-described wind turbine tower often employs a steel monopole that employs a cylindrical shell and has a structure in which a base plate provided at the bottom end of the tower shell is secured to a steel-reinforced concrete base with anchoring bolts. Accompanying equipment, for example, an elevator, a ladder, cables, a stage, etc., is installed inside such a tower, and therefore, in order to support the accompanying equipment in the tower, tower-internal-equipment brackets (hereinafter, referred to as "brackets"), which are welded to internal wall surfaces of the tower shell, are provided.

Figure 16:
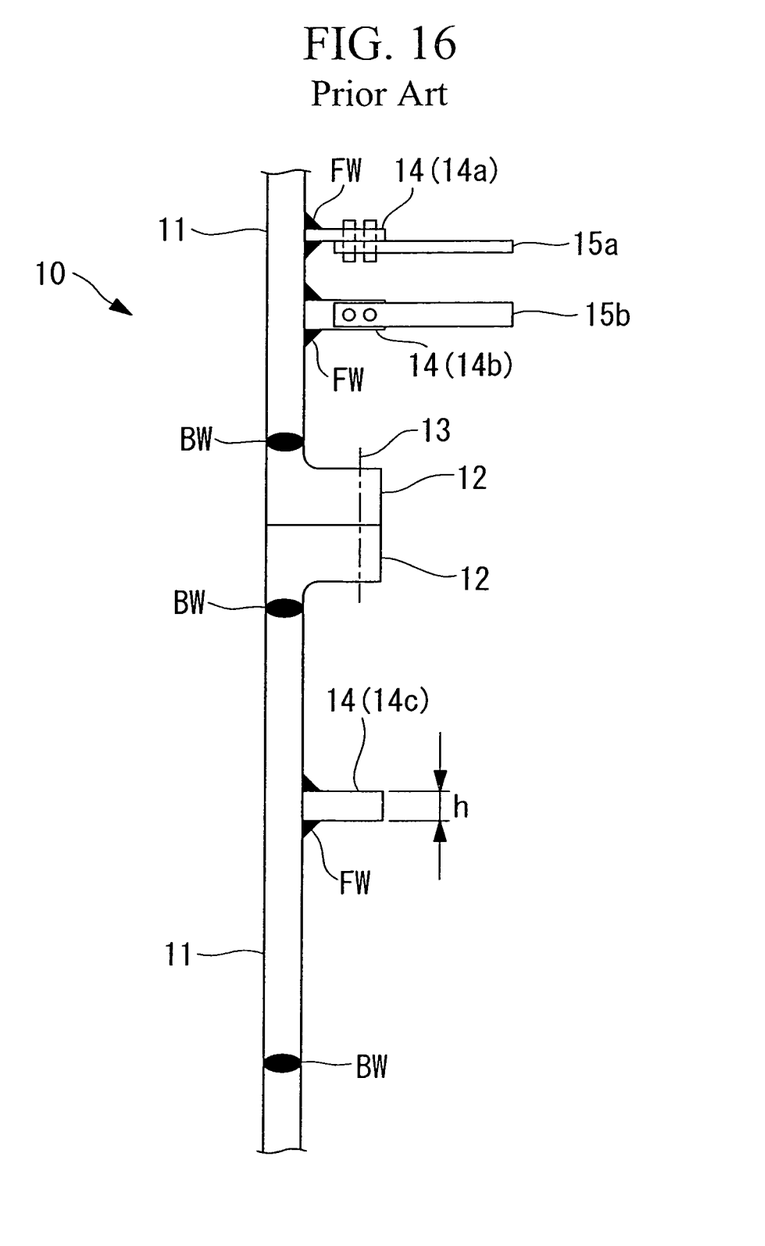
FIG. 16 is a longitudinal sectional view of a relevant portion, showing an example of the internal structure of a wind turbine tower as an example of a conventional tower-internal-equipment bracket structure.

FIG. 16 is a partial sectional view, showing an example of an internal structure of a tower shell 10 in a conventional monopole-type steel tower.

The illustrated tower shell 10 has a structure in which a desired height is achieved by joining a plurality of cylindrical shells 11. Accordingly, flanges 12 are attached at both ends of each cylindrical shell 11 by means of butt welding BW, and the individual cylindrical shells 11 are connected at the flange portions 12 of adjacent cylindrical shells 11 and are joined with bolts/nuts 13. With regard to the cylindrical shells 11, plate members are cylindrically shaped and end portions thereof are connected by means of butt welding.

In addition, brackets 14 are attached at appropriate locations on internal walls of the cylindrical shells 11 by means of fillet welding FW, for example, as with the illustrated brackets 14a, 14b, and 14c. Reference signs 15a and 15b in the figure indicate the tower internal equipment.

Other known bracket support structures include those in which, for example, magnets and adhesive are used, as disclosed in the following patent literature, in which case the fillet welding is not applied to the internal walls of the cylindrical shells.

CITATION LIST

Patent Literature

{PT 1} U.S. Patent Application, Publication No. 2010/0122508 Specification.
{PTL 2} U.S. Patent Application, Publication No. 2003/0147753 Specification.
{PTL 3} U.S. Patent Application, Publication No. 2007/0125037 Specification.

SUMMARY OF INVENTION

Technical Problem

In the above-described steel tower, it is known that the fatigue strength of the tower shell 10 is adversely affected when the brackets 14, etc. are attached to the inner wall surfaces of the tower shell 10 by means of fillet welding FW.

In the case in which the tower shell 10 is provided with the brackets 14 attached by means of fillet welding FW, setting the bracket height h (see FIG. 16) to less than 50 mm can satisfy DC80 (EC3 Table 8.4, Detail 1), which is a fatigue strength classification (grade) applied in Europe.

On the other hand, with regard to butt welding BW in the tower shell 10, the fatigue strength classification DC80 (EC3 Table 8.3, Detail 11) can be satisfied by performing a predetermined non-destructive test (NDT). Furthermore, with regard to butt welding BW in the tower shell 10, the fatigue strength classification can be improved to DC112 (EC3 Table 8.3, Detail 1) by applying additional processing in which the welded shape is processed into a smooth shape. For example, SM, EN, ASTM materials, etc. are generally used as base material for the tower shell 10, whose fatigue strength classification is DC160.

Against such a background, in order to increase the fatigue strength of a tower shell provided with brackets etc. for supporting tower internal equipment in a steel tower of a wind turbine generator, there is a demand for a bracket attachment structure which requires no fillet welding.

The present invention has been conceived in light of the above-described circumstances, and an object thereof is to provide a tower-internal-equipment bracket structure that has a welded structure that can ensure a fatigue strength classification equal to or greater than that of butt welding or that requires no welding, and to provide a wind turbine generator provided with this tower internal equipment bracket structure.

Solution to Problem

In order to achieve the above-described object, the present invention employs the following solutions.

A tower-internal-equipment bracket structure according to a first aspect of the present invention is a tower-internal-equipment bracket structure provided inside a pole-type steel tower, employing a cylindrical shell, to support tower internal equipment, wherein a ring-shaped member having a protruding portion toward the tower interior is interposed, by means of butt welding, between divided portions formed by dividing the shell at a desired position in an axial direction, and the protruding portion serves as a bracket-member support portion for the tower internal equipment.

For example, in such a tower-internal-equipment bracket structure, because the ring-shaped member having the protruding portion toward the tower interior is interposed, by means of butt welding, between the divided portions formed by dividing the shell at the desired position in the axial direction, and the protruding portion serves as the bracket-member support portion for the tower internal equipment, a bracket for the tower internal equipment can be provided inside the tower without employing fillet welding, which has a low fatigue strength classification.

It is desirable that the ring-shaped member in this case be interposed with an upper limit defined by a region in which the fatigue strength is dominant, that is, a range from ⅓ to ½ at a base side in the tower axial direction. With regard to upper portions of the tower, because the influence of fatigue strength is small, fillet welding, which facilitates bracket attachment, should be employed.

A tower-internal-equipment bracket structure according to a second aspect of the present invention is a tower-internal-equipment bracket structure provided inside a pole-type steel tower, employing a cylindrical shell, to support tower internal equipment, wherein a bar-shaped member with a cross-sectional shape having a protruding portion toward the tower interior is interposed, by means of butt welding, in a divided portion of the shell in a circumferential direction to form a cylindrical shape, and the protruding portion serves as a bracket-member support portion for the tower internal equipment.

In such a tower-internal-equipment bracket structure, because the bar-shaped member with a cross-sectional shape having the protruding portion toward the tower interior is interposed, by means of butt welding, in the circumferential-direction in divided portion of the shell to form the cylindrical shape, and the protruding portion serves as a bracket-member support portion for the tower internal equipment, a bracket for the tower internal equipment can be provided inside the tower without employing fillet welding, which has a low fatigue strength classification. Such a bar-shaped member also functions as a longitudinal rib that increases bending stress of the tower.

In the tower-internal-equipment bracket structures of the first aspect and the second aspect described above, it is preferable that the ring-shaped member and the bar-shaped member have a substantially T-shaped cross-section.

The members with the substantially T-shaped cross-section that are suitable in this case include, for example, CT beams formed by cutting an H beam into two at the center of the web.

A tower-internal-equipment bracket structure according to a third aspect of the present invention is a tower-internal-equipment bracket structure provided inside a pole-type steel tower, employing a cylindrical shell, to support tower internal equipment including a ring-shaped bracket having a smaller diameter than an internal-wall surface of the shell; and a plurality of tightening bolts that are threaded by passing through the ring-shaped bracket in a radiating pattern, wherein the ring-shaped bracket is secured in a circumferentially compressed state by causing bolt ends to make close contact with the internal-wall surface by tightening the tightening bolts.

In such a tower-internal-equipment bracket structure, because the ring-shaped bracket having a smaller diameter than the internal-wall surface of the shell and the plurality of tightening bolts that are threaded to pass through the ring-shaped bracket in a radiating pattern are provided, and the ring-shaped bracket is secured in the circumferentially compressed state by causing the bolt ends to make close contact with the internal-wall surface by tightening the tightening bolts, a bracket for the tower internal equipment can be provided inside the tower without employing welding with a low fatigue strength classification, such as fillet welding.

In this case, by interposing elastic friction members, for example, ones like rubber mats, between the bolt ends and the internal-wall surface, the frictional force is increased, thus enhancing the degree of close contact, and stability against vibrations is also enhanced.

A tower-internal-equipment bracket structure according to a fourth aspect of the present invention is a tower-internal-equipment bracket structure provided inside a pole-type steel tower, employing a cylindrical shell, to support tower internal equipment, wherein a plurality of bracket elements formed by dividing, in a circumferential direction, a ring-shaped bracket with a smaller diameter than an internal-wall surface of the shell are joined by threading joining bolts in which tightening portions are provided by forming reverse screws at both ends thereof; the ring-shaped bracket is expanded in the circumferential direction by operating the joining bolts; and the ring-shaped bracket is secured by causing an outer circumferential surface thereof to make close contact with the internal-wall surface.

In such a tower-internal-equipment bracket structure, the plurality of bracket elements formed by dividing, in the circumferential direction, a ring-shaped bracket with a smaller diameter than the internal-wall surface of the shell are joined by threading the joining bolts in which the tightening portions are provided by forming the reverse screws at both ends thereof; the ring-shaped bracket is expanded in the circumferential direction by operating the joining bolts; and the ring-shaped bracket is secured by causing the outer circumferential surface thereof to make close contact with the internal-wall surface; therefore, a bracket for the tower internal equipment can be provided inside the tower without employing welding with a low fatigue strength classification, such as fillet welding.

In this case, by interposing elastic friction members, for example, ones like rubber mats, between the outer circumferential surface of the ring-shaped bracket and the internal-wall surface, the frictional force is increased, thus enhancing the degree of close contact, and stability against vibrations is also enhanced.

A tower-internal-equipment bracket structure according to a fifth aspect of the present invention is a tower-internal-equipment bracket structure provided inside a pole-type steel tower, employing a cylindrical shell, to support tower internal equipment, wherein a step portion is formed at an internal-wall surface of the shell to serve as a bracket-member support portion for the tower internal equipment.

In such a tower-internal-equipment bracket structure, because the step portion is formed at the internal-wall surface of the shell to serve as a bracket-member support portion for the tower internal equipment, a bracket for the tower internal equipment can be provided inside the tower without employing welding with a low fatigue strength classification, such as fillet welding.

Such step portions of the fifth aspect include those formed by providing a difference in plate thickness at a butt-welded portion of the shell divided in an axial direction, those formed with a depression portion formed in the internal-wall surface of the shell, and those formed at a reduced-diameter portion where the shell is deformed into a substantially conical shape.

A wind turbine generator according to a sixth aspect of the present invention is a wind turbine generator in which a rotor head that is attached at an end of a nacelle and that is provided with turbine blades rotates by receiving wind force, thus driving a generator, wherein the nacelle is installed on a tower provided with a tower-internal-equipment bracket structure according any one of the first aspect to the fifth aspect described above.

In such a wind turbine generator, because the nacelle is installed on the tower provided with the tower-internal-equipment bracket structure according any one of the first aspect to the fifth aspect described above, the reliability and durability of the wind turbine generator can be enhanced with a tower-internal-equipment bracket structure that has a welded structure that can ensure a fatigue strength classification equal to or greater than that of butt welding or that requires no welding.

Advantageous Effects Of Invention

With the present invention described above, because a bracket attachment structure whose welding grade is enhanced to or beyond the upper limit (DC93) of butt welding or a bracket attachment structure with no welding is provided, it is possible to increase fatigue strength of a tower shell provided with brackets for supporting tower internal equipment and to enhance the reliability and durability of a wind turbine generator.

DESCRIPTION OF EMBODIMENTS

Embodiments of a tower-internal-equipment bracket structure and a wind turbine generator according to the present invention will be described below on the basis of the drawings.

Figure 15:
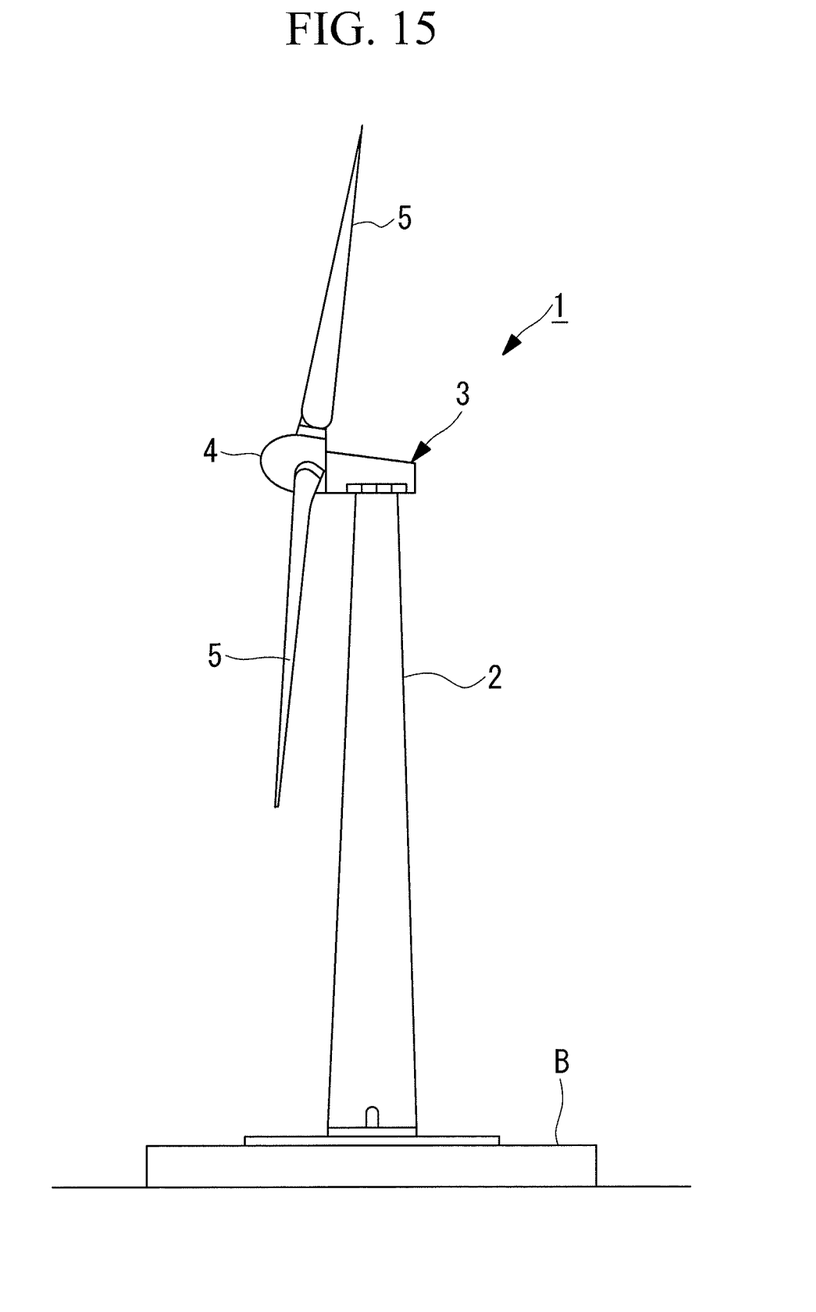
FIG. 15 is a front view, showing, in outline, a general wind turbine generator.

An upwind-type wind turbine generator 1 shown in FIG. 15 is provided with a wind turbine tower (hereinafter, referred to as "tower") 2 on a base B, a nacelle 3 mounted at the top end of the tower 2, and a rotor head 4 that is provided at an end of the nacelle 3 and that is supported thereto in a manner allowing rotation about a substantially horizontal lateral rotation axis.

A plurality of (for example, three) turbine blades 5 are attached to the rotor head 4 in a radiating pattern around the rotation axis thereof. By doing so, the force of wind that strikes the turbine blades 5 from the rotation axis direction of the rotor head 4 is converted to motive force that rotates the rotor head 4 about the rotation axis.

In addition, an anemometer that measures wind speed in the surroundings, an anemoscope that measures wind direction, and so on, are provided at appropriate places on the outer circumferential surface (for example, a top portion, etc.) of the nacelle 3.

Specifically, in the wind turbine generator 1, the rotor head 4 that rotates about the substantially horizontal rotation axis by receiving wind force with the turbine blades 5 drives the generator (not shown) provided inside the nacelle 3 to generate power, and the nacelle 3 is provided at the top end of the tower 2 erected on the steel-reinforced concrete base B, being supported in a manner allowing yawing. In this case, the tower 2 is a steel monopole type and is a cylindrical tower in which the required length (height) is ensured by connecting a plurality of tower sections divided in the height direction at flanges (not shown) provided at end portions thereof.

{First Embodiment (First Aspect)}

Figure 1:
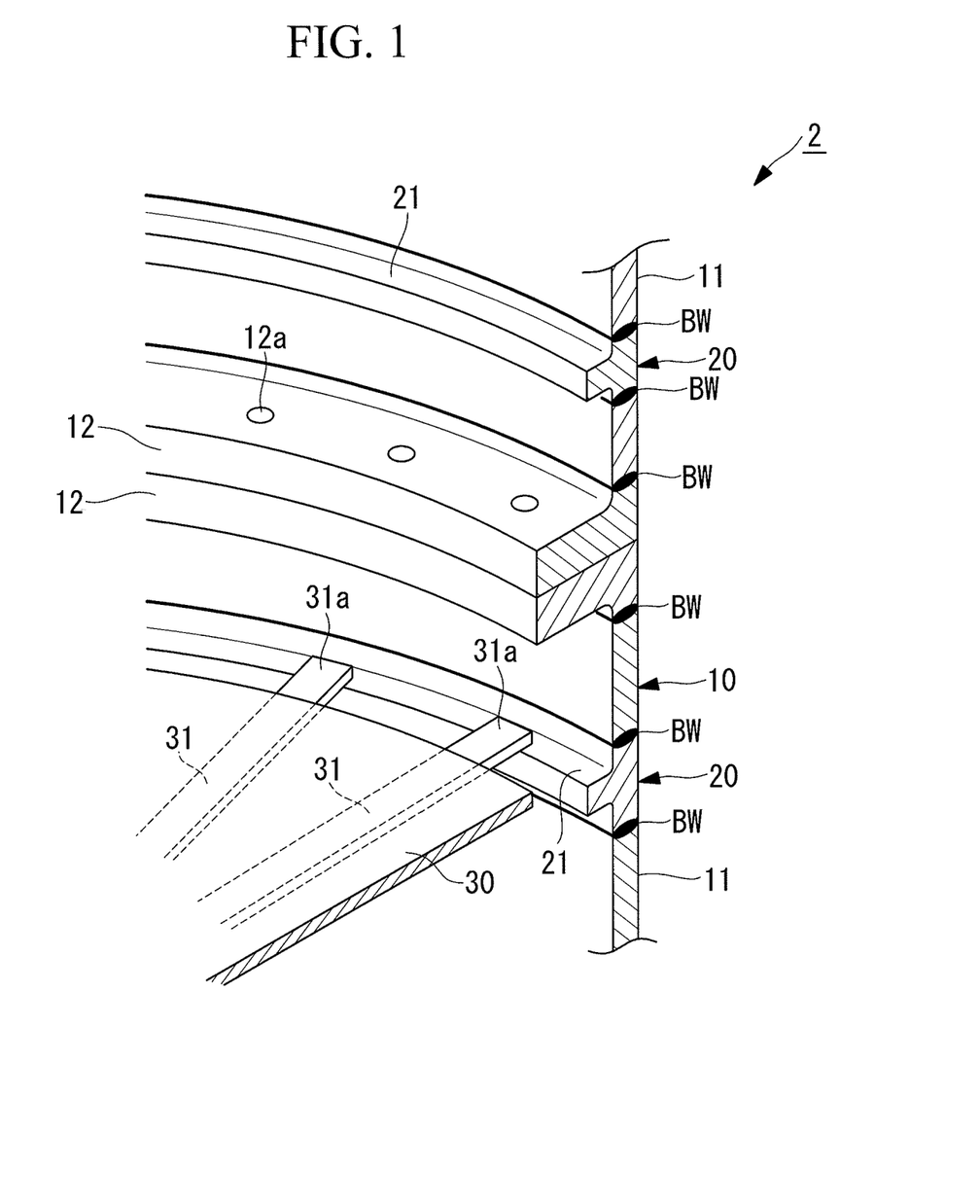
FIG. 1 is a perspective sectional view of relevant portions, showing a first aspect of a tower-internal-equipment bracket structure according to the present invention.

The tower shells 10 of the tower 2 described above have a structure in which, for example, as shown in FIG. 1, a cylindrical shell 11 formed by cylindrically shaping a steel plate member and by connecting ends thereof by means of butt welding serves as one tower section, and a plurality of the cylindrical shells 11 are joined in the axial direction to achieve a desired height. To join the adjacent cylindrical shells 11, flanges 12 attached at both ends thereof by means of butt welding BW are connected with each other and are joined with nuts and bolts (not shown) that pass through bolt holes 12a of both flanges 12.

Inside a pole-type steel tower employing such cylindrical shells 11, various tower internal equipment, for example, a ladder, a stage, cables, etc., are provided. Because of this, tower-internal-equipment brackets are required to securely support the tower internal equipment inside the tower 2.

Therefore, in an aspect of this embodiment, ring-shaped members 20 having protruding portions 21 toward the tower interior are interposed between divided portions provided by dividing the cylindrical shells 11 at desired positions in the axial direction, and are joined thereto by means of butt welding.

Figure 5:
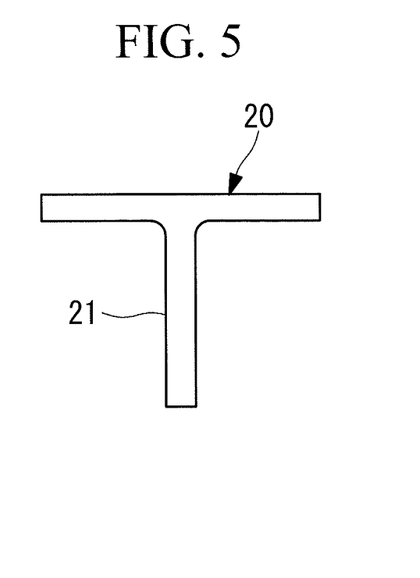
FIG. 5 is a sectional view, showing a cross-sectional shape of a CT beam as an example of a member having a substantially T-shaped cross-section.

For the ring-shaped members 20, for example, as shown in FIG. 5, members having a substantially T-shaped cross-section are used by being formed into a ring shape. In this case, members having a substantially T-shaped cross-section that are suitable for the ring-shaped members 20 include, for example, CT beams formed by cutting an H beam into two at the center of its web.

Figure 6:
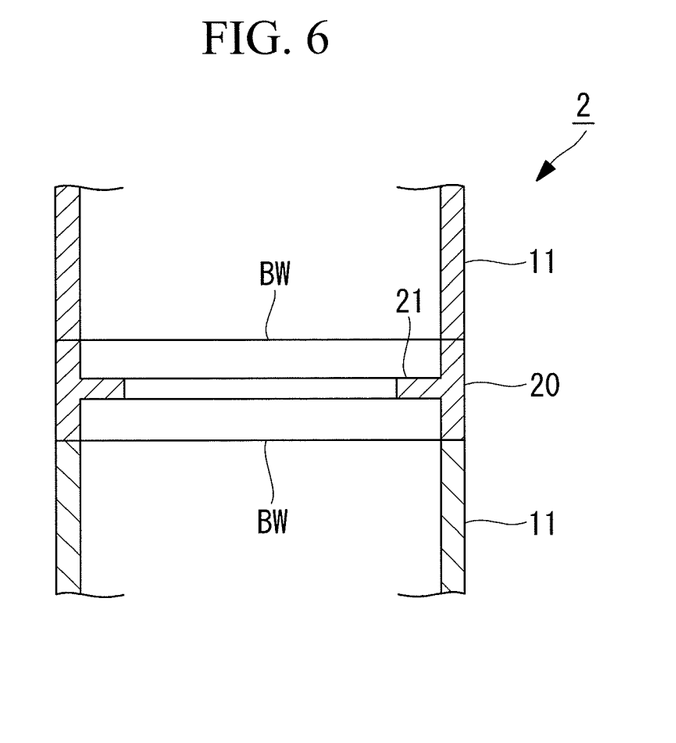
FIG. 6 is a longitudinal sectional view, showing a relevant portion of a wind turbine tower employing the CT beam shown in FIG. 5 as a bracket-member support portion of the first aspect.

Such ring-shaped members 20 are, for example, as shown in FIG. 6, joined at both ends, top and bottom, with the ends of the divided portions of the cylindrical shells 11 by means of butt welding BW in a state in which the protruding portions 21 protrude inward in the cylindrical shells 11. In this case, with regard to positions in the axial direction, that is, the positions in the height direction of the tower 2, where the ring-shaped members 20 are interposed, appropriate positions should be appropriately selected so as not to interfere with the joining positions of the flanges 12 and so that the protruding portions 21 support the tower internal equipment.

As a result, the protruding portions 21 of the ring-shaped members 20 exist over the entire circumference at the interior of the tower 2, and the protruding portions 21 can be utilized as bracket-member support portions for the tower internal equipment.

Figure 3:
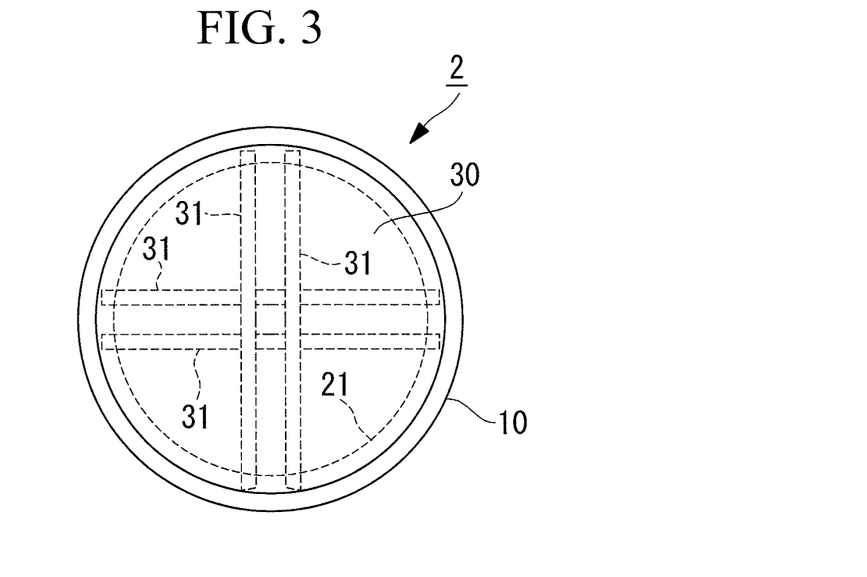
FIG. 3 is a lateral sectional view, showing a cross-section of a stage level for the example of the tower internal equipment installation shown in FIG. 2.

In the concrete examples shown in FIGS. 1 and 3, end portions 31a of brackets 31 that support stages (tower internal equipment) 30 that cover the entire cross-section are mounted on top surfaces of the protruding portions 21. In this case, a plurality of (four in the illustrated example) brackets 31 are disposed so as to function as beams that cross over the tower interior, which has a circular cross-section, and end portions 31a of each bracket 31 are secured to the protruding portions 21 with an appropriate mechanical means so that positional displacement does not occur. Therefore, the stages 30 can be mounted at the top surfaces of the brackets 31 by being securely supported thereon.

Figure 2:
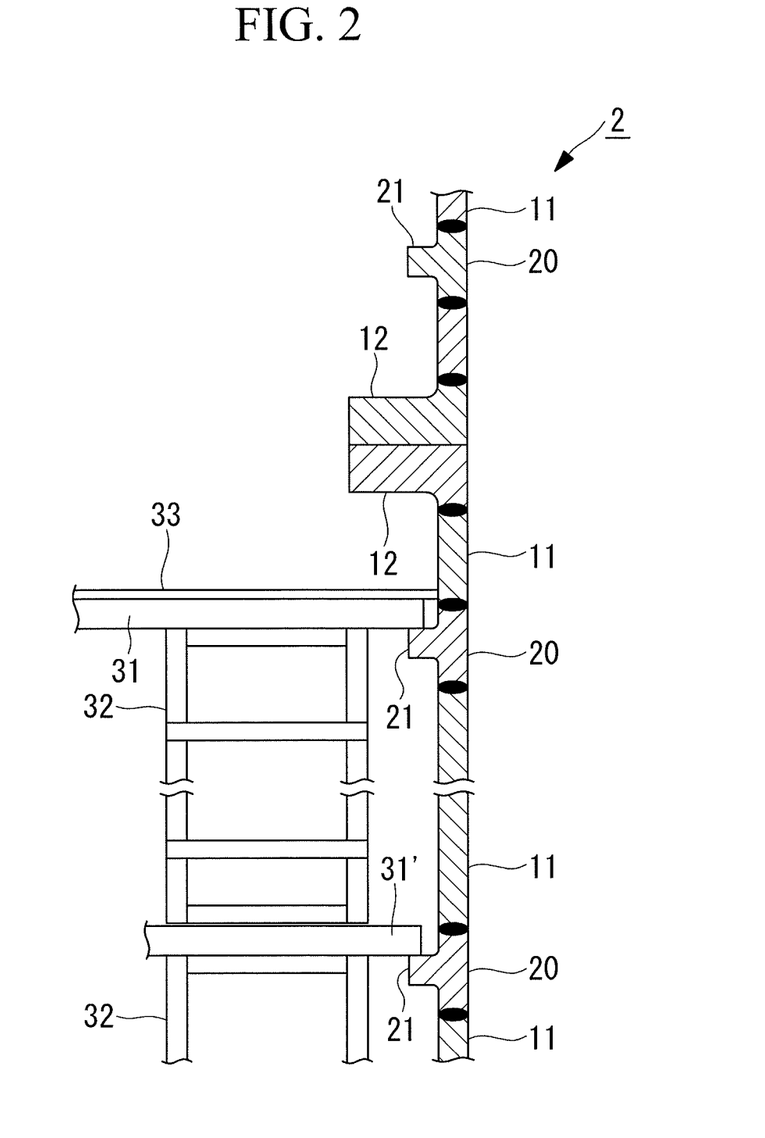
FIG. 2 is a longitudinal sectional view, showing an example of tower internal equipment installation for the tower-internal-equipment bracket structure of the first aspect shown in FIG. 1.
Figure 4:
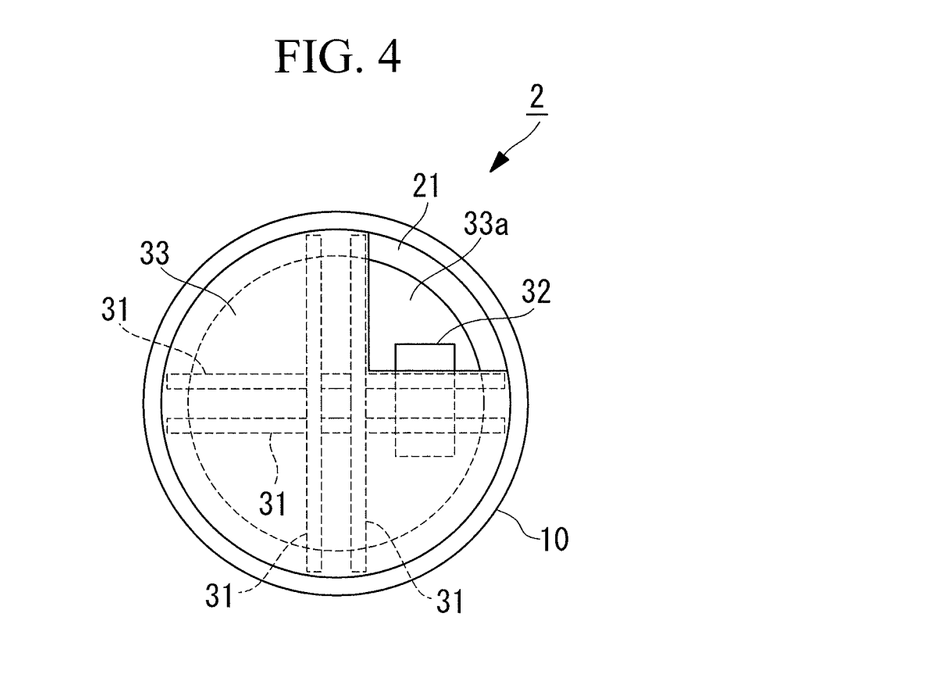
FIG. 4 is a lateral sectional view, showing a cross-section of a general portion for the example of the tower internal equipment installation shown in FIG. 2.

In addition, FIGS. 2 and 4 show concrete structural examples that support a ladder 32.

In these concrete examples, for example, a ladder stage 33, in which a substantially quarter-circle opening portion 33a is formed, is mounted on the top surfaces of the brackets 31, and the ladder 32 is secured at appropriate positions in the brackets 31 and/or the ladder stage 33. For securing in this case, because the brackets 31 and the ladder stage 33 are not strengthening members of the tower 2, nuts and bolts or welding can be utilized.

Furthermore, in the case of securely supporting a long ladder 32, as shown in FIG. 2, for example, brackets 31' provided by utilizing the protruding portions 21 of the ring-shaped members 20 should be utilized at an intermediate level, etc. where the ladder stage 33 does not exist. Because the brackets 31' are not strengthening members of the tower 2, the ladder 32 in this case can also be secured with nuts and bolts or welding.

Although an illustration is omitted, tower internal equipment such as cables for generated power, control cables, etc. can also be securely supported by utilizing similar structures as for the case of the stage 30 and the ladder 32.

With such a tower-internal-equipment bracket structure, because the ring-shaped members 20 having the protruding portions 21 toward the tower interior are interposed between the divided portions provided by dividing the cylindrical shells 11 at desired positions in the axial direction, and are joined thereto by means of butt welding BW, and the protruding portions 21 serve as the bracket-member support portions for the tower internal equipment, the tower-internal-equipment brackets 31 and 31' can be provided inside the tower without employing fillet welding, which has a low fatigue strength classification.

Figure 14:
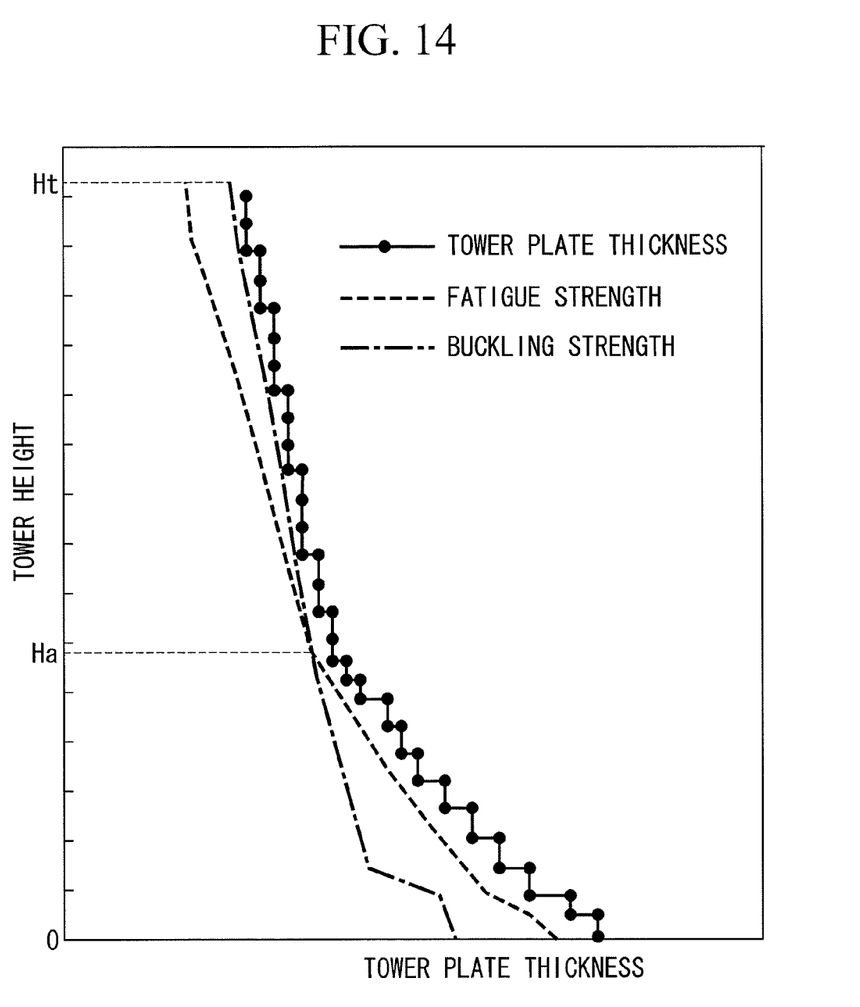
FIG. 14 is an explanatory diagram, showing tower height on the vertical axis and fatigue strength, buckling strength, and tower-plate thickness distribution on the horizontal axis.

As shown in FIG. 14, in the tower 2 of the wind turbine generator 1, fatigue strength (indicated by broken line) and buckling strength (indicated by one-dot chain line) influence the determination of the plate thickness, and the plate thickness of the cylindrical shells 11 is thicker at the bottom end.

In the tower 2, whose total height is Ht, because the influence of buckling strength is generally greater than that of fatigue strength at the bottom end, the tower plate thickness is determined so as to satisfy the fatigue strength, and thus, changes in plate thickness also increase.

However, the fatigue strength described above is approached with increasing tower height and reverses when the tower height reaches a point Ha. The tower height Ha where the fatigue strength and the buckling strength, which influence the determination of the tower plate thickness, reverse in this way falls within a range from ⅓ to ½ of the total height Ht (Ha=⅓Ht to ½Ht) from the bottom end of the tower.

Therefore, it is desirable that the ring-shaped members 20 be interposed at the bottom end, with the upper limit defined by a region in the height direction of the tower 2 in which the fatigue strength is dominant, that is, the range from ⅓ to ½ at the base side in the tower axial direction. In other words, in the configuration in which the bracket-member support portions are formed with the ring-shaped members 20 described above, the range from ⅓ to ½ at the bottom end of the tower 2 is set to be the upper limit of application, and, with regard to the bracket support members closer to the top end than this application range, because the influence of fatigue strength is small, the brackets may be attached on the internal wall of the cylindrical shells 11 by means of fillet welding.

{Second Embodiment (Second Aspect)}

Next, a tower-internal-equipment bracket structure according a second aspect of the present invention will be described on the basis of FIG. 7. Parts similar to those in the embodiment described above are given the same reference signs, and detailed descriptions thereof will be omitted.

Figure 7:
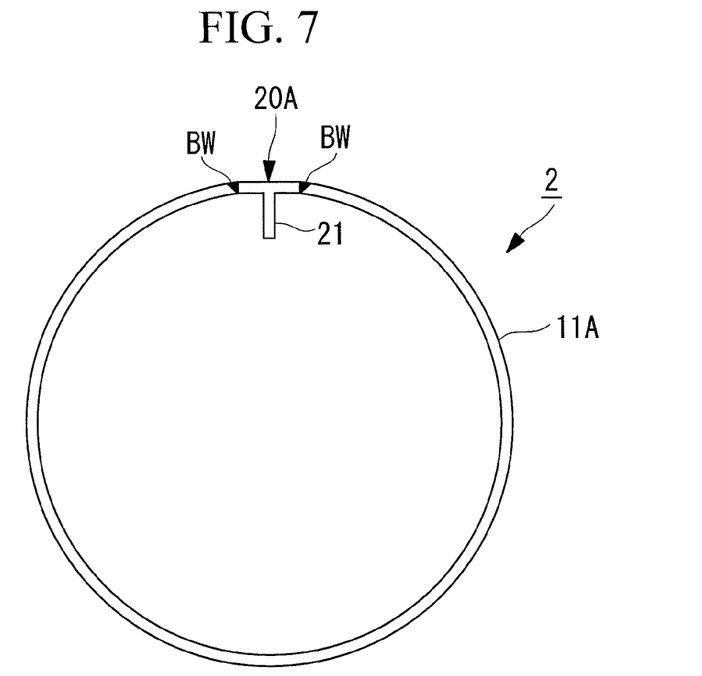
FIG. 7 is a lateral sectional view, showing a second aspect of the tower-internal-equipment bracket structure according to the present invention.

In the tower-internal-equipment bracket structure shown in FIG. 7, bar-shaped members 20A having a cross-sectional shape in which the protruding portions 21 face the tower interior are interposed, by means of butt welding, at circumferential division portions of cylindrical shells 11A to form cylindrical shape, and thus, the protruding portions 21 serve as the bracket support portions for the tower internal equipment. It is also possible to provide a plurality of such bar-shaped members 20A in the circumferential direction of the cylindrical shells 11A as needed.

In other words, in the cylindrical shells 11A of this embodiment, members having a substantially T-shaped cross-section, such as CT beams, etc., shown in FIG. 5 are vertically used in the bar shape without modification; the bar-shaped members 20A are interposed between both ends of the plate-shaped shell members formed into a substantially cylindrical shape and are joined thereto by means of butt welding BW; thus forming the ring-shaped members that form the tower 2.

As a result, inside the cylindrical shells 11A, the protruding portions 21 that protrude toward the tower axial center extend in the top-bottom direction of the tower 2.

With such a tower-internal-equipment bracket structure, the brackets for the tower internal equipment can be provided inside the tower without employing fillet welding FW, which has a low fatigue strength classification. Specifically, the brackets for the tower internal equipment can be attached with a structure in which top ends of the protruding portions 21 are utilized as bracket-installation surfaces, a structure in which the protruding portions 21 are sandwiched at both ends, etc., without having to perform fillet welding FW on the tower internal wall surface.

In addition, in the cylindrical shells 11A in which the above-described bar-shaped members 20A exist, particularly because the bar-shaped members 20A have the protruding portions 21, there is an additional advantage in that the protruding portions 21 also serve as longitudinal ribs that increase bending stress of the tower 2.

{Third Embodiment (Third Aspect)}

Next, a tower-internal-equipment bracket structure according a third aspect of the present invention will be described on the basis of FIGS. 8 and 9. Parts similar to those in the embodiment described above are given the same reference signs, and detailed descriptions thereof will be omitted.

Figure 8:
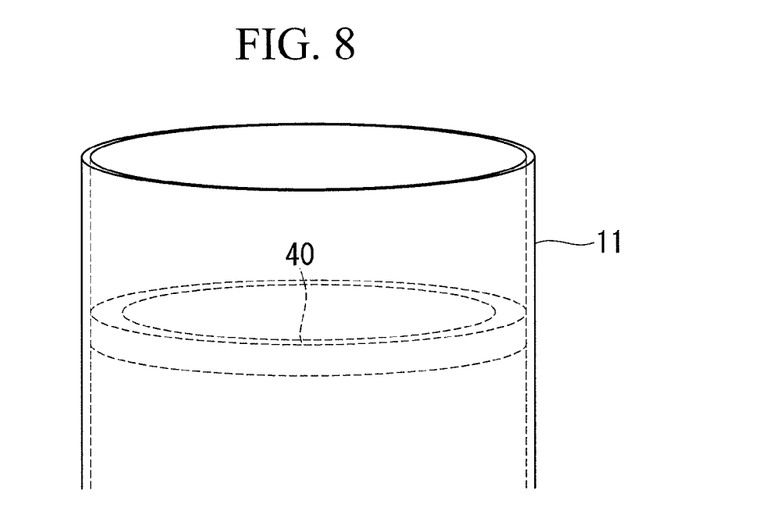
FIG. 8 is a perspective view of a relevant portion, showing, in outline, a bracket for a third aspect and a fourth aspect of the tower-internal-equipment bracket structure according to the present invention.
Figure 9:
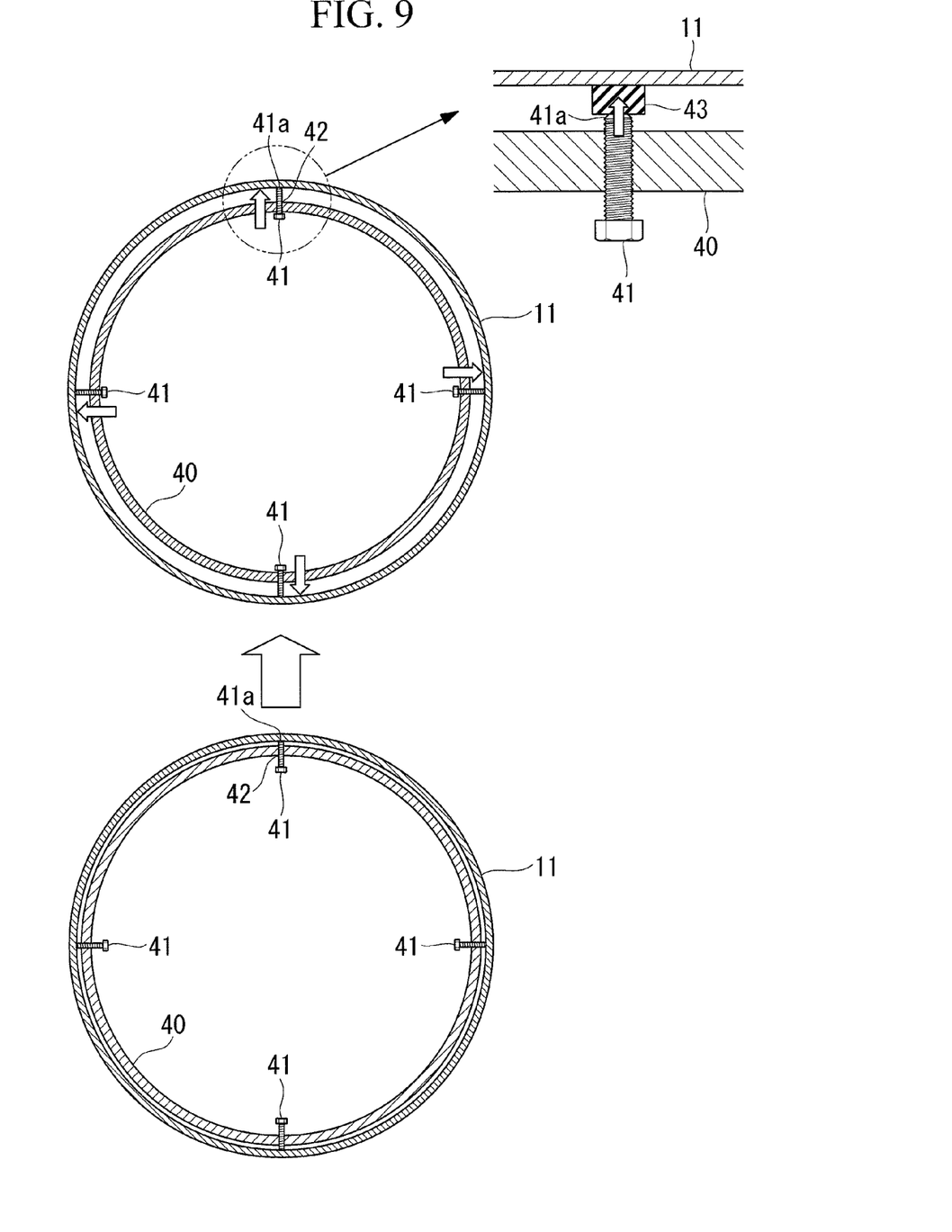
FIG. 9 is an explanatory diagram, showing a structure and an installation method for the third aspect of the tower-internal-equipment bracket structure according to the present invention.

The tower-internal-equipment bracket structure shown in FIG. 8 secures ring-shaped brackets 40 by establishing close contact with the internal-wall surface of the cylindrical shells 11 which are constituent members of the tower 2, without performing welding.

A specific close-contact structure will be described below on the basis of FIG. 9.

In the illustrated example configuration, ring-shaped brackets 40 having smaller diameters than the internal-wall surfaces of the cylindrical shells 11 and a plurality of tightening bolts 41 that are threaded to pass through the ring-shaped brackets 40 in a radiating pattern are provided. In addition, the tightening bolts 41 are threaded in bolt holes 42, which radially penetrate the ring-shaped brackets 40, by being inserted therein so as to point outward from the axial center side, and the tightening bolts 41 are subsequently tightened to press bolt ends 41a into close contact with the internal-wall surfaces. At this time, the ring-shaped brackets 40 are held in a horizontal state at desired levels until they are completely secured.

It is desirable that the plurality of tightening bolts 41 be disposed at equal pitch (four at 90-degree pitch in the illustrated example) in the circumferential direction.

By tightening the tightening bolts 41, the ring-shaped brackets 40 that are secured to the internal walls of the cylindrical shells 11 in this way are subjected to a force in the direction that moves them toward the axial center. In addition, when the tightening bolts 41 receive the reaction force from the internal walls, the ring-shaped brackets 40 simultaneously generate hoop force that compresses them in the circumferential direction to establish balance.

Specifically, the concrete example in this case is a structure in which the plurality of tightening bolts 41 are tightened radially outward so that the bolt ends 41a are brought into close contact with the internal-wall surfaces, and the ring-shaped brackets 40 are secured to the internal walls of the cylindrical shells 11.

In this case, because a force that acts in the perpendicular direction, for example, the load of tower internal equipment, etc., is transmitted by friction between bolt shafts of the tightening bolts 41 and the internal-wall surfaces of the cylindrical shells 11, support with the ring-shaped brackets 40 is made possible.

With such a tower-internal-equipment bracket structure, by securing the ring-shaped brackets 40 in a state in which they are compressed in the circumferential direction, the brackets for the tower internal equipment can be provided inside the tower 2 without employing welding with a low fatigue strength classification, such as fillet welding.

The support structure for the tower internal equipment may be directly supported by the ring-shaped brackets 40 by employing the nuts and bolts, etc.; alternatively, a structure may be employed in which separate bracket members welded to the ring-shaped brackets 40 are employed.

In this case, it is desirable that elastic friction members, for example, rubber mats 43, be interposed between the bolt ends 41a and the internal-wall surfaces of the cylindrical shells 11. Such elastic friction members can enhance the degree of close contact by increasing frictional force and can also enhance stability against vibrations. In addition, it is possible to prevent damage to the internal-wall surfaces of the cylindrical shells 11 by tightening the tightening bolts 41.

{Fourth Embodiment (Fourth Aspect)}

Next, a tower-internal-equipment bracket structure according a fourth aspect of the present invention will be described on the basis of FIGS. 8 and 10. Parts similar to those in the embodiment described above are given the same reference signs, and detailed descriptions thereof will be omitted.

As shown in FIG. 8, this embodiment is a modification of the third aspect described above, wherein the ring-shaped brackets 40 are brought into close contact with the internal-wall surfaces of the cylindrical shells 11, which are the constituent members of the tower 2, to be secured without performing welding.

Figure 10:
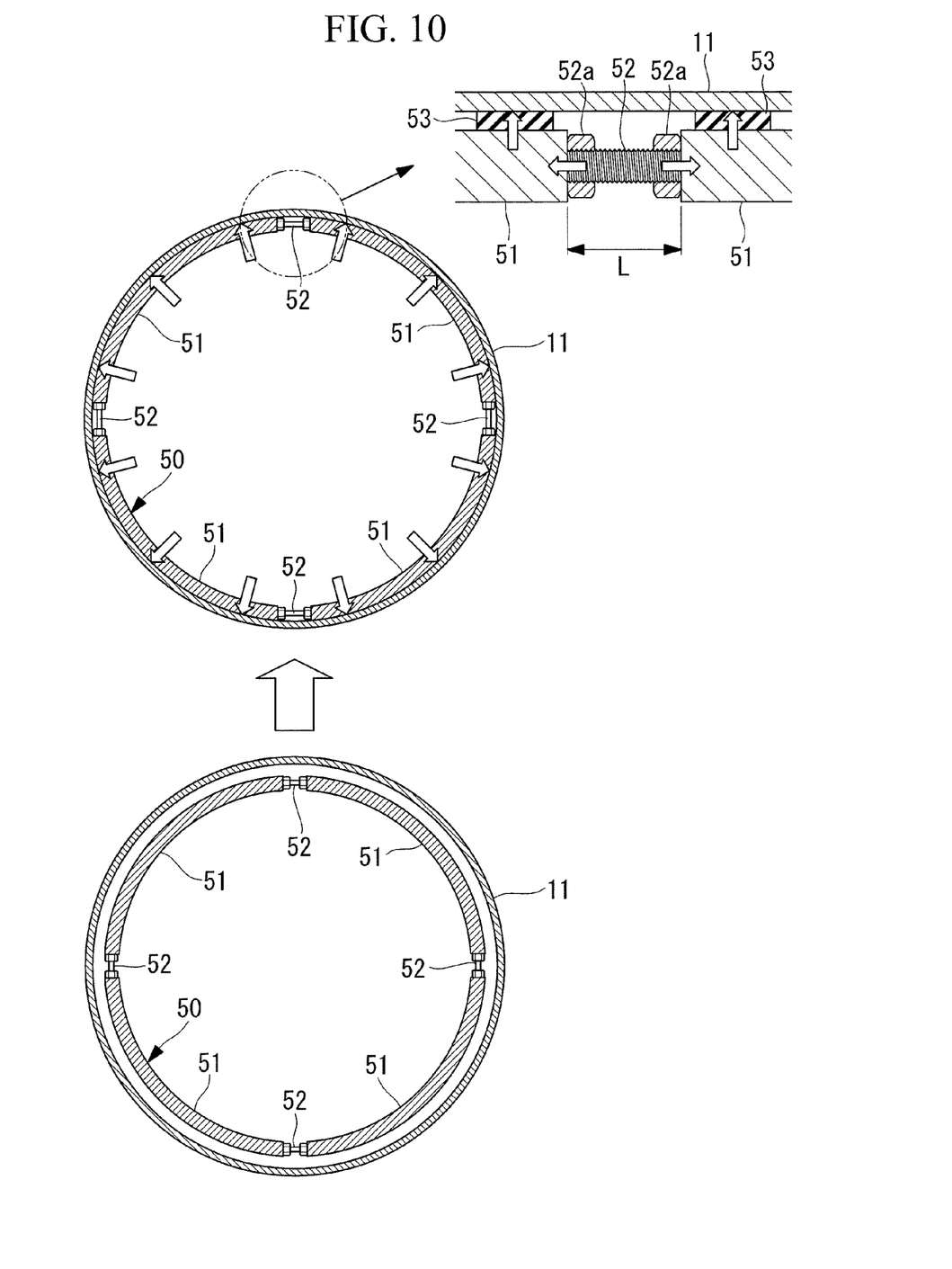
FIG. 10 is an explanatory diagram, showing a structure and an installation method for the fourth aspect of the tower-internal-equipment bracket structure according to the present invention.

In the example configuration of a specific close-contact structure shown in FIG. 10, a plurality of bracket elements 51 formed by dividing a ring-shaped bracket 50 having smaller diameter than the internal-wall surfaces of the cylindrical shells 11 in the circumferential direction are joined by threading joining bolts 52 between them, where tightening portions 52a are provided by forming reverse screws at both ends thereof. In other words, appropriate gaps are provided between the adjacent bracket elements 51 in the ring-shaped bracket 50, and the ring-shape is formed by joining them with the joining bolts 52 disposed between these gap portions.

The joining bolts 52 are provided with the reverse screws at both ends so that intersurface distances L at the gap portions can be changed in accordance with the rotation direction by threading them to opposing wall surfaces of adjacent bracket elements 51. Specifically, by rotating the joining bolts 52 in the same direction, for example, nuts that serve as the tightening portions 52a are rotated thereby to make both bolt ends enter the opposing wall surfaces of the bracket elements 51, thus reducing the intersurface distances L, or to make both bolt ends come out of the opposing wall surfaces of the bracket elements 51, thus increasing the intersurface distances L.

When the joining bolts 52 are operated in this way and the intersurface distances L are increased to establish a state in which the ring-shaped bracket 50 is expanded in the circumferential direction, deformation tends to occur in the direction in which the diameters of the ring-shaped bracket 50 expands; therefore, the outer circumferential surface thereof comes into close contact with the internal-wall surface of the cylindrical shell 11 and becomes secured thereto. In other words, the outer circumferential surface of the ring-shaped bracket 50 is directly pressed against the internal-wall surface of the cylindrical shell 11 to be in close contact therewith, and this embodiment differs from the above-described third aspect in this point.

Therefore, the outer circumferential surface of the ring-shaped bracket 50 is caused to make close contact with the internal-wall surface of the cylindrical shell 11 to be secured thereto; therefore, also by employing the structure of this embodiment, the brackets for the tower internal equipment can be provided inside the tower 2 without employing welding with a low fatigue strength classification, such as fillet welding.

In addition, in this embodiment, it is desirable that elastic friction members, for example, ones like the rubber mats 53, be interposed between the outer circumferential surface of the ring-shaped bracket 50 and the internal-wall surface of the cylindrical shell 11. Such elastic friction members can enhance the degree of close contact by increasing the frictional force and can also enhance stability against vibrations. In addition, it is possible to prevent damage to the internal-wall surface of the cylindrical shell 11 by bringing the ring-shaped bracket 50 into close contact therewith.

{Fifth Embodiment (Fifth Aspect)}

Next, a tower-internal-equipment bracket structure according a fifth aspect of the present invention will be described on the basis of FIGS. 11 to 13. Parts similar to those in the embodiment described above are given the same reference signs, and detailed descriptions thereof will be omitted.

Figure 11:
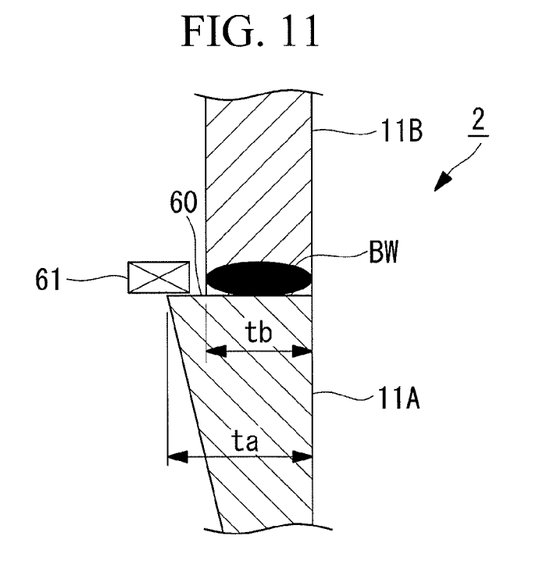
FIG. 11 is a longitudinal sectional diagram of a relevant portion, showing the structure of a step portion for a fifth aspect of the tower-internal-equipment bracket structure according to the present invention.

For example, as shown in FIG. 11, in this embodiment, step portions 60 are formed at the internal-wall surfaces of the cylindrical shells 11 to serve as bracket-member support portions for the tower internal equipment.

For the step portion 60 shown in FIG. 11, a plate-thickness difference is provided between end portions of the cylindrical shells 11A and 11B joined by means of butt welding BW.

Specifically, the top-end plate thickness Ta of the cylindrical shell 11A placed on the bottom side is larger than bottom-end plate thickness Tb of the cylindrical shell 11B placed on the top side (Ta>Tb), and, by welding them so that outer circumferential sides thereof are aligned, a surface of the step portion 60 that protrudes over the entire inner circumference of the tower 2 is formed. Therefore, by utilizing this step portion 60, it is possible to support a ring-shaped bracket 61 around the entire circumference without welding.

Because the bracket 61 in this case is not a strengthening member of the tower 2, the support structure for the tower internal equipment may directly be supported by the bracket 61 by employing nuts and bolts, etc.; alternatively, it is also possible to provide support by directly or indirectly welding it to the bracket 61.

In addition, for example, as shown in FIG. 14, stepwise thinning of the shell plate thickness of the tower 2 from the bottom end to the top end in the height direction of the tower may be utilized for the step portion 60 described above.

Figure 12:
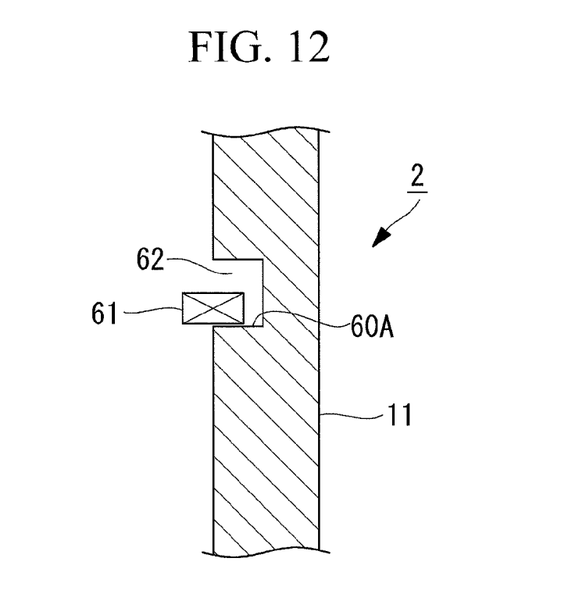
FIG. 12 is a longitudinal sectional view of a relevant portion, showing a first modification of the step portion in FIG. 11.

As in a first modification shown in FIG. 12, a depression portion 62 formed at the internal-wall surface of the cylindrical shell 11 may be used as a step portion 60A. The depression portion 62 is a groove formed around the entire circumference by, for example, machining.

Figure 13:
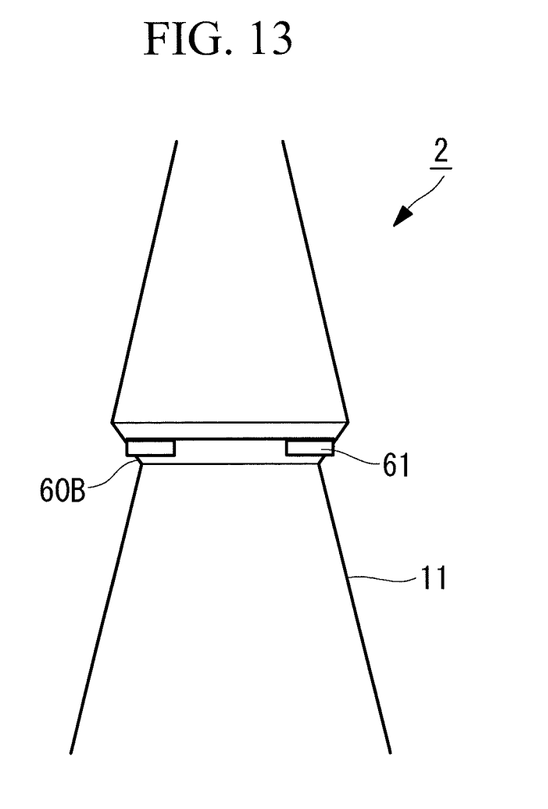
FIG. 13 is a longitudinal sectional view of a relevant portion, showing a second modification of the step portion in FIG. 11.

In addition, as in a second modification shown in FIG. 13, a step portion 60B may be formed at a reduced-diameter portion 63 by deforming the cylindrical shell 11 into a substantially conical shape. The reduced-diameter portion 63 shown in FIG. 13 is exaggerated for the convenience of illustration; however, in the actual ring-shaped bracket 61, it suffices to have a sufficient diameter difference to allow engagement thereof.

With such tower-internal-equipment bracket structures, because the step portions 60, 60A, and 60B are formed at the internal-wall surface of the tower shell 10 by a method such as deforming the cylindrical shells 11, the step portions 60, 60A, and 60B serve as the bracket-member support portions for the brackets 61 that support the tower internal equipment. Therefore, the brackets 61 for the tower internal equipment can be provided inside the tower 2 without employing welding with a low fatigue strength classification, such as fillet welding.

Because the tower 2 provided with the tower-internal-equipment bracket structures of the embodiments and modifications described above is provided with tower-internal-equipment bracket structures with welded structures that can ensure a fatigue strength classification equal to or greater than that of butt welding or tower-internal-equipment bracket structures that require no welding, the reliability and durability of the wind turbine generator 1 provided with this tower 2 can be enhanced.

In other words, because a bracket attachment structure whose fatigue strength classification of welding grade is enhanced to or beyond the upper limit (DC93) of butt welding or a bracket attachment structure in which the fatigue strength classification of base material can be directly applied because welding is not used is provided, the fatigue strength of the tower shell 10 provided with brackets for supporting the tower internal equipment can be increased, and thus, the reliability and durability of the wind turbine generator can be enhanced.

Although the above-described wind turbine generator 1 has been described assuming that the tower 2 is securely installed on the base, the present invention is not limited thereto, and it is applicable to, for example, a marine wind turbine generator that generates power by securing its tower to a floating structure installed on the ocean, etc.

In addition, the present invention is not limited to the embodiments described above; for example, it is applicable to both upwind type and downwind type, and appropriate alterations are possible within a range that does not depart from the spirit thereof.

{Reference Signs List}
1 wind turbine generator
2 wind turbine tower (tower)
3 nacelle
4 rotor head
5 wind turbine blade
10 tower shell
11 cylindrical shell
12 flange
20 ring-shaped member
21 protruding portion
31, 31', 61 bracket
40, 50 ring-shaped bracket
41 tightening bolt
43, 53 rubber mat (elastic friction member)
51 bracket element
52 joining bolt
52a tightening portion
60, 60A, 60B step portion

The invention claimed is:

1. A tower-internal-equipment bracket structure provided inside a pole-type steel tower, employing a cylindrical shell, to support tower internal equipment,
wherein a cylindrical shell member having a protruding portion toward a tower interior is interposed, by means of butt welding, between divided portions formed by dividing said cylindrical shell at a desired position in an axial direction, and the protruding portion serves as a bracket-member support portion for the tower internal equipment.

2. A tower-internal-equipment bracket structure according to claim 1, wherein said cylindrical shell member is interposed, with an upper limit defined by a range from ⅓ to ½ at a base side in the axial direction.

3. A tower-internal-equipment bracket structure according to claim 1, wherein said cylindrical shell member has a substantially T-shaped cross-section.

4. A wind turbine generator in which a rotor head that is attached at an end of a nacelle and that is provided with turbine blades rotates by receiving wind force, thus driving a generator,
wherein the nacelle is installed on a tower provided with a tower-internal-equipment bracket structure according claim 1.

5. A tower-internal-equipment bracket structure according to claim 1, wherein the cylindrical shell member includes an upper portion having a top surface and a lower portion having a bottom surface, the upper portion contacting one of the divided portions at the top surface thereof through the butt welding and the lower portion contacting another of the divided portions at the bottom surface thereof through the butt welding, and the protruding portion is arranged between the upper portion and the lower portion.

6. A tower-internal-equipment bracket structure according to claim 5, wherein the protruding portion annually protrudes toward the tower interior.

7. A tower-internal-equipment bracket structure provided inside a pole-type steel tower, employing a cylindrical shell, to support tower internal equipment,
wherein a bar-shaped member with a cross-sectional shape having a protruding portion toward a tower interior is interposed, by means of butt welding, in a divided portion of the shell in a circumferential direction to form a cylindrical shape, and the protruding portion serves as a bracket support portion for the tower internal equipment, and
wherein the bar-shaped member has a substantially T-shaped cross-section.

8. A wind turbine generator in which a rotor head that is attached at an end of a nacelle and that is provided with turbine blades rotates by receiving wind force, thus driving a generator,
wherein the nacelle is installed on a tower provided with a tower-internal-equipment bracket structure according claim 7.

9. A tower-internal-equipment bracket structure according to claim 7, wherein the cylindrical shell member includes one side portion and another side portion, the one side portion contacting a part of the cylindrical shell through the butt welding and the another side portion contacting another part of the cylindrical shell through the butt welding, and the bar-shaped member is arranged between the one side portion and the another side portion.

10. A tower-internal-equipment bracket structure provided inside a pole-type steel tower, employing a cylindrical shell, to support tower internal equipment comprising:
a ring-shaped bracket having a smaller diameter than an internal-wall surface of the shell; and
a plurality of tightening bolts that are threaded by passing through the ring-shaped bracket in a radiating pattern,
wherein the ring-shaped bracket is secured in a circumferentially compressed state by causing bolt ends to make close contact with the internal-wall surface by tightening the tightening bolts.

11. A tower-internal-equipment bracket structure according to claim 10, wherein elastic friction members are interposed between the bolt ends and the internal-wall surface.

12. A wind turbine generator in which a rotor head that is attached at an end of a nacelle and that is provided with turbine blades rotates by receiving wind force, thus driving a generator,
wherein the nacelle is installed on a tower provided with a tower-internal-equipment bracket structure according claim 10.

13. A tower-internal-equipment bracket structure provided inside a pole-type steel tower, employing a cylindrical shell, to support tower internal equipment,
wherein a plurality of bracket elements formed by dividing, in a circumferential direction, a ring-shaped bracket with a smaller diameter than an internal-wall surface of the shell are joined by threading joining bolts in which tightening portions are provided by forming reverse screws at both ends thereof;
the ring-shaped bracket is expanded in the circumferential direction by operating the joining bolts; and
the ring-shaped bracket is secured by causing an outer circumferential surface thereof to make close contact with the internal-wall surface.

14. A tower-internal-equipment bracket structure according to claim 13, wherein an elastic friction member is interposed between the outer circumferential surface of the ring-shaped bracket and the internal-wall surface.

15. A wind turbine generator in which a rotor head that is attached at an end of a nacelle and that is provided with turbine blades rotates by receiving wind force, thus driving a generator,
wherein the nacelle is installed on a tower provided with a tower-internal-equipment bracket structure according claim 13.

16. A tower-internal-equipment bracket structure provided inside a pole-type steel tower, employing a cylindrical shell, to support tower internal equipment,
wherein a step portion is formed at an internal-wall surface of the shell to serve as a bracket-member support portion for the tower internal equipment, and
wherein the step portion is formed at a reduced-diameter portion where the shell is deformed into a substantially conical shape.

17. A tower-internal-equipment bracket structure according to claim 16, wherein the step portion is formed by providing a difference in plate thickness at a butt-welded portion of the shell divided in an axial direction.

18. A tower-internal-equipment bracket structure according to claim 16, wherein the step portion is formed with a depression portion formed at the internal-wall surface of the shell.

19. A wind turbine generator in which a rotor head that is attached at an end of a nacelle and that is provided with turbine blades rotates by receiving wind force, thus driving a generator,
wherein the nacelle is installed on a tower provided with a tower-internal-equipment bracket structure according claim 16.

* * * * *